July 27, 1948.  W. F. ALLER  2,446,071
SIZE GAUGING DEVICE
Filed April 10, 1946
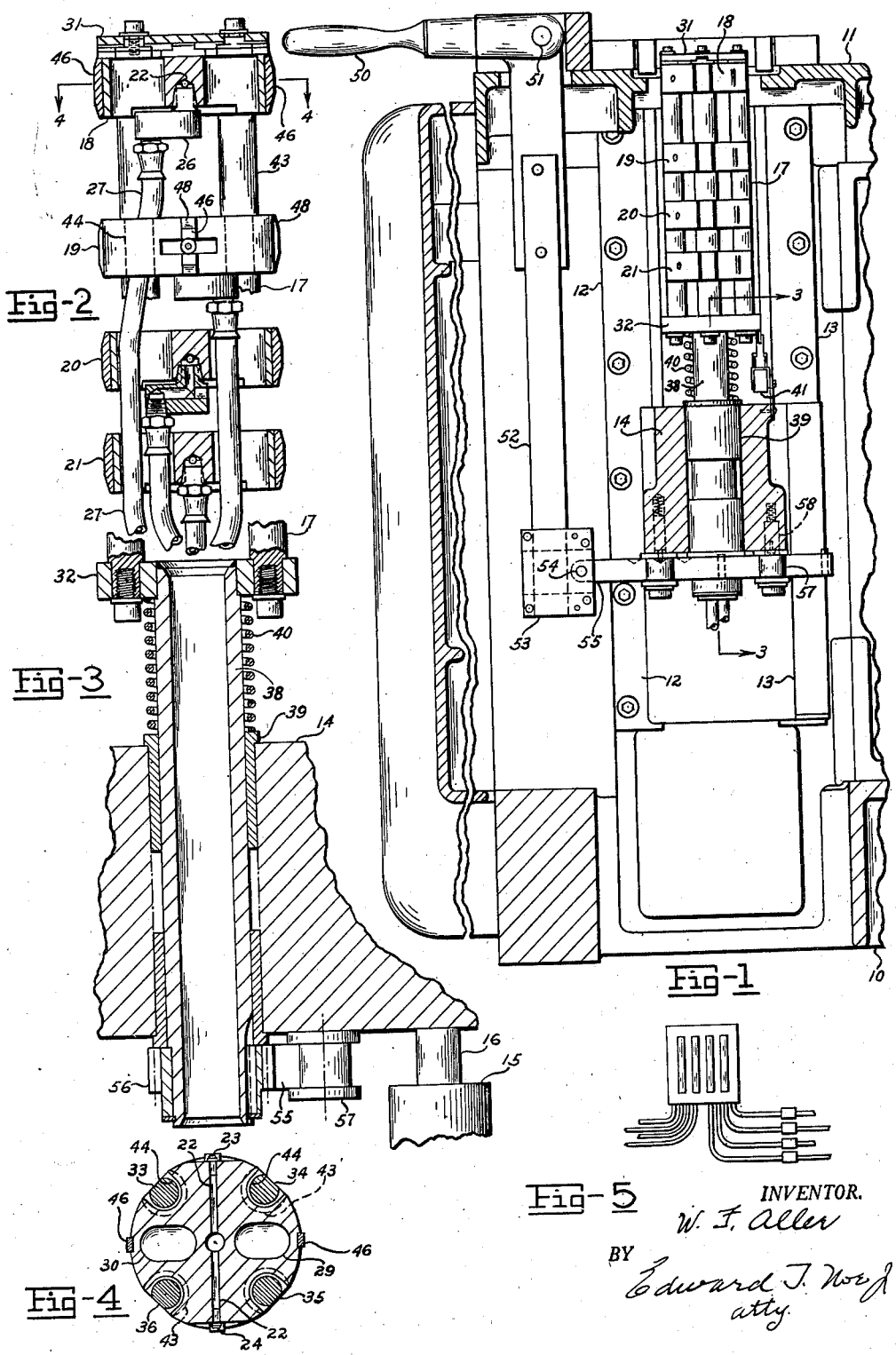
INVENTOR.
W. F. Aller
BY
Edward T. Noyl
atty.

Patented July 27, 1948

2,446,071

UNITED STATES PATENT OFFICE 2,446,071

SIZE GAUGING DEVICE

Willis Fay Aller, Dayton, Ohio, assignor to The Sheffield Corporation, Dayton, Ohio, a corporation of Ohio Application April 10, 1946, Serial No. 660,904

7 Claims. (Cl. 73—37.5)

This invention relates to gauging apparatus for simultaneously gauging an object at a number of different locations.

One object of the invention is the provision of a gauging apparatus for simultaneously checking or gauging the diameter of a hole in different transverse planes, and incorporating a plurality of independent gauging elements mounted for relative movement on a common carrier and having independent connections to different gauging devices.

Another object is the provision of a gauging apparatus of the character mentioned in which each of the gauging elements is provided with one or more gauging orifices that form fluid leakage paths, the gauging orifices being in communication with passages that are connected by pipes extending through recessed portions in the gauging elements.

Another object is the provision of a gauging device of the character mentioned, adapted for gauging objects carried by a support on which the gauging elements or carrier is movably arranged.

Another object is the provision of a gauging apparatus for checking or gauging the diameter of a hole in an object in different transverse planes, and incorporating means for moving the gauging elements or carrier in an axial direction so that it is engaged with the object, and means for rotating the carrier about its own axis so that the diameters can be compared or checked in different diametrical directions.

Other objects and advantages of the invention will be apparent from the following description, the appended claims, and the accompanying drawing, in which:

Fig. 1 is a side elevation, partly in central vertical section, through a gauging apparatus embodying the present invention;

Fig. 2 is a side elevation, partly in central vertical section, through the carrier and the gauging elements that are movably arranged on the carrier;

Fig. 3 is a vertical section on the line 3—3 of Fig. 1, showing the lower portion of the carrier;

Fig. 4 is a horizontal section on the line 4—4 of Fig. 2; and

Fig. 5 is a view of the flow gauging devices to which the various fluid pipes of the gauging apparatus are adapted to be connected.

Referring more particularly to the drawing, in which the same reference numerals have been applied to like parts in the several views; 10 generally designates a support having an upper table portion 11 for holding the article to be gauged. This support is provided with vertical guide plates 12 and 13 which guide a beam 14 for up and down movement, beam 14 being moved by means of an hydraulic cylinder or cylinders 15 suitably mounted in the support 10 and each operating a piston rod 16 which is secured to the lower side of the beam. The beam 14 causes the elevation or retraction of a carrier 17 shown in Fig. 2 which holds a plurality of independently movable gauging elements. In the form of the invention illustrated, the gauging elements are adapted to enter a hole in an object to be checked. This hole may, for example, be the cylinder of an internal combustion engine. The engine may be moved along the table portion 11 until the hole is properly positioned over the carrier and fluid pressure may then be supplied, under the manual control of the operator, to the pressure cylinder 15 to cause elevation of the beam 14, thus raising the carrier to a predetermined position and causing it to insert its several elements into the cylinder.

Each gauging element, as shown, is a block, preferably of metal, the construction shown providing four of these blocks as indicated at 18, 19, 20 and 21. The block 18, for example, is provided with a transversly extending fluid passage 22, communicating at its opposite ends with gauging nozzles 23 and 24, the outer surfaces of which are arranged to be very slightly spaced away from the surface of the object to be gauged so that fluid leakage paths are provided between the nozzles and the object. The size of these fluid leakage paths is determined by the size of the workpiece, which thus controls the amount of air leakage that can take place under pressure of the supplied air. The fluid passage 22 is adapted for connection to a flow tube gauging device of the character disclosed in Patent No. 2,254,259, which includes a tapered gauging tube containing a float the position of which is an indication of the rate of flow of fluid through the passage 22 and out through the two leakage nozzles 23 and 24. Air is supplied to lower end of the tapered tube under constant pressure maintained by a pressure regulating valve. The passage 22, as shown in Fig. 2, is in communication with an attachment 26, the pipe 27 leading from this connection extending downwardly and passing through recessed portions in the gauging elements or blocks below the block 18. These recessed portions are indicated as elliptical passages 29 and 30 in Fig. 4.

The carrier that forms the support and moving means for the several gauging elements or blocks, is formed of upper and lower end plates 31 and 32, secured together by means of vertical rods 33, 34, 35 and 36, the lower plate 32 being fixed to a hollow shaft 38 which extends down through a bearing sleeve 39 arranged in the beam 14. The connection between the shaft 38 and sleeve 39 is such that the shaft can move axially and can rotate about its own axis. A spring 40 normally holds plate 32 and shaft 38 in a raised position in respect to the beam 14, but permits the beam 14 to be elevated without correspondingly moving the carrier if the workpiece does not permit the gauging elements to enter the hole to be gauged. Under such conditions the spring 40 will be compressed, and the relative movement between the beam 14 and plate 32 will operate a microswitch 41 so that the operator will be advised as by a signal or lamp controlled by that switch, that the gauging carrier has not entered the workpiece when it should.

The rods 33 to 36 inclusive are provided with spacing portions 43 of somewhat larger diameter than reduced portions 44, the reduced portions 44 entering grooves in the gauging elements, as shown in Fig. 4. These grooves are slightly larger than the transverse dimensions of the reduced portions 44, so that some freedom of movement is permitted the gauging elements with respect to the rods in all directions transverse of the hole axis. The enlarged portions of the rods hold the gauging elements spaced apart with respect to one another, but each gauging element can move with respect to the rods, and quite independently of one another, so that each gauging element can center itself in the hole of the object to be gauged. Each gauging element is provided with segmental bearing portions or strips, preferably of hard metal such as carboloy, as shown at 46, these carboloy strips being inserted in the outer parts of each gauging element, preferably 90° apart. The upper portions of these carboloy strips are chamfered as shown at 48 so that each gauging element can readily center itself and enter the object to be gauged when the carrier is moved upwardly from the retracted position shown.

Each of the gauging elements is provided with a transverse passage and a pair of diametrically opposed gauging nozzles communicating with the ends of its respective passage, and the pipe extending from the passage of one element leads downwardly through the recesses or openings of the gauging elements beneath, the several pipes then extending axially down through the passage in the hollow shaft 38 and communicating through flexible tubes with the several individual flow tubes shown in Fig. 5 so that the level of the floats of these flow tubes will compare the diameters at different points along the wall that is gauged, with the readings obtained when an object of the exact required size is used.

The arrangement of the gauging elements, with recesses or grooves for receiving the spacing or locating rods, and with recessed portions for receiving the pipes leading to the passages of several gauging elements, permits the passage in the gauging element through which air under pressure is supplied to the gauging nozzles to be a straight diametrical passage, and permits the parts to be conveniently assembled and disassembled.

When the gauging carrier is raised, the cylinder block or other object to be gauged being in place on the support 10, the reading of the several flow tubes shown in Fig. 5 can be readily obtained so that the operator can determine whether or not the gauged part conforms to the required tolerance conditions, and can determine the uniformity of the diameters in several axially spaced planes in which the readings are taken. While the gauging carrier is elevated, the operator can then rotate the entire carrier about its own axis so he can see if there is any out-of-round condition. A 90° rotation of the carrier is caused when the operator lifts upwardly on the handle 50 which is pivoted on a shaft 51 carried by the frame 10. Rigid with the handle 50 is a lever arm 52 and slidable along the lever 52 is a slide plate 53 having a pivotal connection at 54 to a rack bar 55. The rack bar has rack teeth engaging a pinion 56 which is fixed to the lower end of the hollow shaft 38, as shown in Fig. 3. Rollers 57 rotatably carried on pins 58 threaded in the beam 14 hold the rack 55 engaged with the pinion 56 and maintain a horizontal position of the rack. The rack moves up and down with the beam 14, carrying the slide plate 53 with it along the lever arm 52 so that the lever 50 can be moved by the operator at any time to cause rotational movement of the carrier and the gauging elements about their longitudinal axes.

It will thus be apparent that a hole in an object can be explored completely and with precision, giving the operator an indication of the diameters of the object at different axially spaced locations, and showing any out-of-round condition by rotating the carrier about its own axis to move the gauging nozzles annularly with respect to the object. Each gauging element adjusts itself independently of the others so that the position of one gauging element will have no effect on the centering action of any other. Injury to the apparatus is prevented due to the yielding movements of the carrier permitted by the spring 40, if the hole in the object is small enough so that the gauging elements will not enter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus for checking the diameter of a hole in an object in different transverse planes comprising a carrier, a plurality of gauging elements mounted on said carrier for limited lateral movement independently of one another, each element having a fluid passage and a pair of diametrically disposed gauging nozzles communicating with said passage and adapted for cooperation with the object to provide fluid leakage paths, said elements having apertures, and pipes extending from the fluid passages of said elements and adapted for connection to fluid flow gauging devices, the pipe connected to the fluid passage of one block extending through the aperture of another block.

2. Gauging apparatus for checking the diameter of a hole in an object in different transverse planes comprising a carrier, a plurality of gauging blocks mounted on said carrier for limited movement independently of one another in any direction in a transverse plane and having chamfered hole entering ends, each block having a fluid passage and a pair of diametrically disposed gauging nozzles communicating with said passage and adapted for cooperation with the object to provide fluid leakage paths, said blocks having apertures, and pipes extending from the fluid passages of said blocks and adapted for connection to fluid flow gauging devices, the pipe connected to the fluid passage of one block extending through the aperture of another block.

3. Gauging apparatus for checking the diameter of a hole in an object in different transverse planes comprising a carrier having end members and guide rods connected thereto, a plurality of gauging blocks carried by said guide rods for limited movement independently of one another in any direction in a transverse plane, each block having a fluid passage and a pair of diametrically disposed gauging nozzles communicating with said passage and adapted for cooperation with the object to provide fluid leakage paths, said blocks having apertures, and pipes extending from the fluid passages of said blocks and adapted for connection to fluid flow gauging devices, the pipe connected to the fluid passage of one block extending through the aperture of another block.

4. Gauging apparatus for checking the diameter of a hole in an object in different transverse planes comprising a carrier, a support for holding the object and mounting said carrier for axial movement, means for moving said carrier axially to engage it with the object, said carrier having a plurality of gauging elements mounted thereon for limited transverse movement independently of one another, each element having a fluid passage and gauging nozzles communicating with said passage and adapted for cooperation with the object to provide fluid leakage paths, and pipes extending from the fluid passages of said elements and adapted for connection to fluid flow gauging devices.

5. Gauging apparatus for checking the diameter of a hole in an object in different transverse planes comprising a carrier, a support for holding the object and mounting said carrier for axial movement, means for moving said carrier axially to engage it with the object, means for rotating said carrier about its own axis, said carrier having a plurality of gauging elements mounted thereon for limited transverse movement independently of one another, each element having a fluid passage and gauging nozzles communicating with said passage and adapted for cooperation with the object to provide fluid leakage paths, and pipes extending from the fluid passages of said elements and adapted for connection to fluid flow gauging devices.

6. Gauging apparatus for checking the diameter of a hole in an object in different transverse planes comprising a carrier having end members and axially extending rods, a plurality of gauging blocks mounted on said carrier for limited transverse movement independently of one another, each block having a fluid passage and a pair of diametrically disposed gauging nozzles communicating with said passage and adapted for cooperation with the object to provide fluid leakage paths, said blocks having apertures, and pipes extending from the fluid passages of said blocks and adapted for connection to fluid flow gauging devices, the pipe connected to the fluid passage of one block extending through the aperture of an adjacent block, a support for holding the object and mounting said carrier for axial and rotational movement, means for moving the carrier axially to advance it into the object, and means for rotating the carrier about its own axis.

7. Gauging apparatus for checking the diameter of a hole in an object in different transverse planes comprising a carrier having end members and axially extending rods, a plurality of gauging blocks mounted on said carrier for limited lateral movement independently of one another, each block having a fluid passage and a pair of diametrically disposed gauging nozzles communicating with said passage and adapted for cooperation with the object to provide fluid leakage paths, said blocks having apertures, and pipes extending from the fluid passages of said blocks and adapted for connection to fluid flow gauging devices, the pipe connected to the fluid passage of one block extending through the aperture of an adjacent block, a support for holding the object and mounting said carrier for axial and rotational movement, means for moving the carrier axially to advance it into the object, and a spring between the carrier and the means which moves the carrier axially so that the moving means can move without advancing the carrier if the carrier is prevented from entering the object.

WILLIS FAY ALLER.

REFERENCES CITED

The following references are of record in the file of this patent:

UNITED STATES PATENTS

| Number | Name | Date |
|---|---|---|
| 1,308,324 | Bellard | July 1, 1919 |
| 2,370,219 | Aller | Feb. 27, 1945 |
| 2,393,246 | Hallowell | Jan. 22, 1946 |